United States Patent

[11] 3,617,226

[72] Inventors Ferdinand List;
Rudolf Strobele; Gunther Strauss, all of Marl, Germany
[21] Appl. No. 724,503
[22] Filed Apr. 26, 1968
[23] Division of Ser. No. 304,622, Aug. 26, 1963, abandoned
[45] Patented Nov. 2, 1971
[73] Assignee Chemische Werke Huls Aktiengesellschaft Marl, Germany
[32] Priority Aug. 31, 1962
[33] Germany
[31] C 27 830

[54] APPARATUS FOR THE CONTINUOUS PREPARATION OF ESTERS
2 Claims, 5 Drawing Figs.
[52] U.S. Cl. .................................................. 23/288 E, 23/262, 23/279, 23/286, 260/475 R
[51] Int. Cl. .................................................. B01j 9/16, C07c 69/76
[50] Field of Search ........................................ 23/279, 288, 286, 262; 260/475 P

[56] References Cited
UNITED STATES PATENTS

| | | | |
|---|---|---|---|
| 572,258 | 12/1896 | Hogan | 23/279 X |
| 1,230,343 | 6/1917 | Tommasi | 23/279 |
| 2,142,943 | 1/1939 | Kerschbaum | 23/279 X |
| 2,222,283 | 11/1940 | Crowell | 23/279 X |
| 3,052,711 | 9/1962 | Glogau et al. | 260/475 P |
| 3,111,394 | 11/1963 | Weber et al. | 23/279 |
| 3,233,982 | 2/1966 | Maginn | 23/279 X |
| 1,188,505 | 6/1916 | Statham | 23/262 X |
| 2,255,445 | 9/1941 | Clarkson | 23/288 K X |
| 2,388,642 | 11/1945 | Ostergaard | 23/288 E X |
| 2,813,891 | 11/1957 | Billing | 260/475 |

FOREIGN PATENTS

| | | | |
|---|---|---|---|
| 556,892 | 7/1923 | France | 23/279 |
| 731,142 | 10/1932 | France | 23/279 |
| 266,437 | 2/1927 | Great Britain | 23/279 |

*Primary Examiner*—Morris O. Wolk
*Assistant Examiner*—Barry S. Richman
*Attorney*—Pierce, Scheffler & Parker ABSTRACT: Apparatus for esterifying terephthalic acid and similar normally solid organic acids, using a rotary tunnel oven equipped with means for continuously contacting particulate solids with gases.

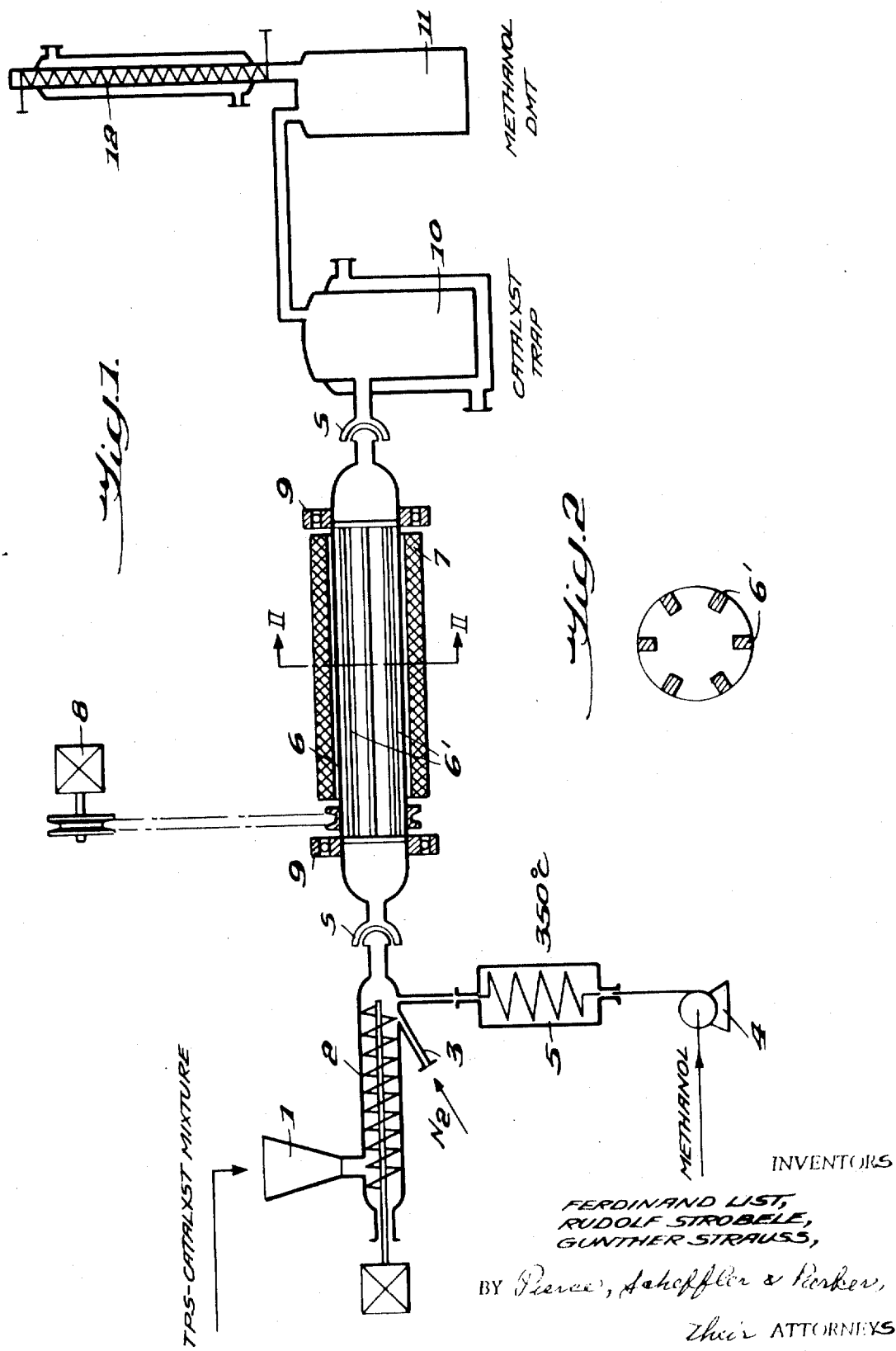

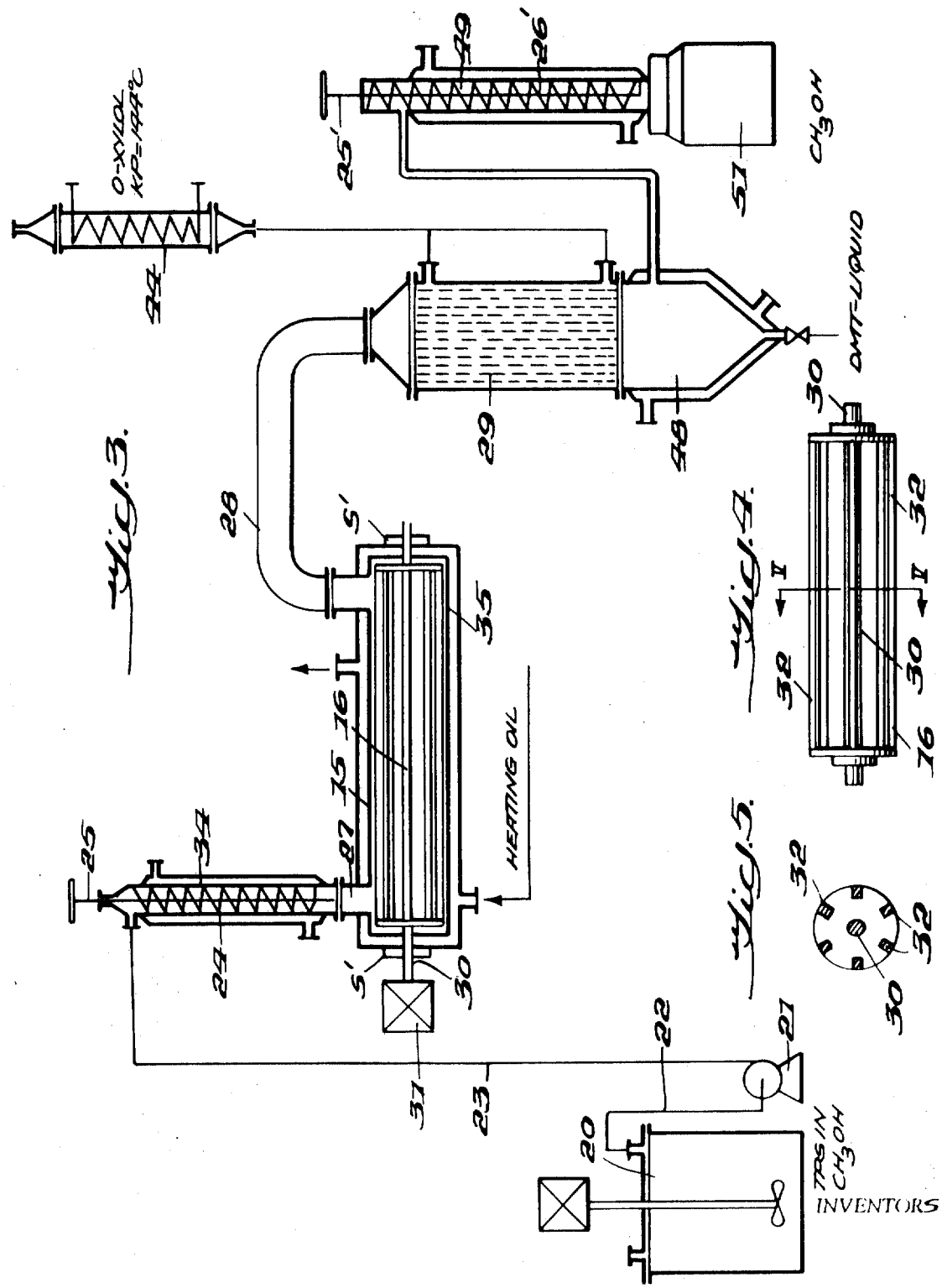

APPARATUS FOR THE CONTINUOUS PREPARATION OF ESTERS

This application is a division of application, Ser. No. 304,622 filed Aug. 26th, 1963, and now abandoned.

The esterification of the terephthalic acid is much more difficult to accomplish than the esterification of the two other isomeric benzenedicarboxylic acids. It is known to esterify terephthalic acid with aliphatic alcohols such as methanol, ethanol, propanol as well as butanols at increased temperature and higher pressure in the presence of catalyzers. However, if acid esterification catalyzers are employed substantial losses of alcohol will occur due to the formation of ethers and olefines. If the esterification is carried out without the presence of esterification catalyzers comparatively long periods of processing time are required in addition to high temperatures in order to attain total esterification, conditions which are conducive to the undesirable formation of ethers and olefines. As a rule, an increase in the periods of reaction will lead correspondingly to an increase in the ether formation (see U.S. Pat. No. 2,491,660 and German Pat. No. 1,034,614). For this reason the proposal has been made to carry out the esterification of the terephthalic acid with aliphatic alcohols in either one or two stages under higher pressure with or without catalyzer (German Pat. No. 1,034,614), for example by esterification of terephthalic acid with methanol first at 150° to 220° C. and subsequently at 220° to 360° C. However, the high pressures of 100 to 300 atmospheres needed in this process require the use of costly equipment. Furthermore, this method of operation requires comparatively long reaction periods with the result that decomposition products will form and lower the yield.

In case of another proposal (German Pat. No. 968,603) pulverulent terephthalic acid is esterified with methanol in a reaction tube heated to 280° to 300° C. The alcohol is introduced into the tube in atomized or gaseous state. By use of directional nozzles or filler bodies the reaction components are guided helically at the inner wall of the reaction tube (with a diameter of 40 cm.). This swirling motion is intended to accomplish a complete intermixture of the components of the reaction. This process also employs catalyzing quantities of additives designed to accelerate the reaction such as hydrochloric acid, borophosphate or phosphoric acid. However, even under these conditions (German published application No. 1,088,474, column 1, paragraph 1) only very small quantities of dimethylester are obtained instead of the expected high yields. Apparently, the gaseous methanol escapes from the reaction tube over the shortest route and the reaction surface is entirely insufficient for the desired gas reaction.

In order to improve the very unsatisfactory results of the pressureless esterification of terephthalic acid with methanol the proposal is made in German published application No. 1,088,474 to carry out the esterification of pulverulent acid with vaporous methanol at increased temperature in a boiling bed of solids which is activated by a carrier gas. Vaporous methanol is employed as carrier gas, and known esterification catalyzers (silicates, hydroxides, oxides, phosphates) with a grain-size ranging from 40 to 500η are used as the boiling bed. If this method is used the ester formation is concluded within a short period of time. The esterification takes place in two stages and can be limited, by adjustment of the height of the boiling bed, to the first stage, in other words to the preparation of the terephthalic acid monomethylester, or extended for the purpose of preparing the diester. The reaction product obtained by this continuous method is very pure because thermal decompositions are avoided due to the brief reaction time.

This method, although offering great advantages, still has substantial difficulties which hinder greatly its industrial application. An homogeneous boiling bed can be maintained only within a very limited range of flow, with the limits of the maximum allowable speed of the gas for any given grain size being determined by the boiling point on the one hand and the flying point on the other hand. The rate of gas flow must be kept within these limits and its magnitude is therefore not variable for any given reactor dimensions. The methods will encounter even greater difficulties if–as is actually the case–the boiling bed is formed by a mixture of two solid materials which have grain-sizes which differ greatly from each other and where one of the materials, namely the terephthalic acid, is subjected to a continuous decomposition by the reaction. There is the danger in case of such nonuniform loose material that the lightest particles will be carried by the gas from the vessel as fine dust. Also, there is the fact that very fine material (particle size of approximately 20μ) tends to form channels because of the great cohesion forces, thus bringing the flow-properties of the dust into question (see Ullmann, "Enzyclopedie der technischen Chemie" 1951, volume 1 page 916). Also known is the danger of erosion within the apparatus and the pipe lines caused by the fine dust which is generated continuously by abrasion of the solids.

Therefore, there exists an extraordinary technological requirement for a method which will permit, without use of expensive equipment and irrespective of the amount of gas flow, the esterification, for example of terephthalic acid, at quantitative yields without the formation of by-products, and especially such terephthalic acids as are obtained by standard oxidation methods at various particle sizes to produce particularly pure esters at high rate of flow and without any disadvantageous features.

It has been found that it is possible to prepare continuously at increased temperature vaporous esters in an advantageous manner by the reaction of an acid with an alcohol where one substance preferably has a high melting point and the other substance is vaporous and is present in excess, in the presence of granular esterification catalyzers in a horizontal tunnel oven at temperatures ranging from 150° to 350° C., preferably 200° to 300° C, and especially 250° to 300° C.

At a high temperature vaporous esters are such esters that are volatile at the selected esterification temperature and can therefore be distilled from the tunnel oven in the form of vapor, for example terephthalic acid monomethylester, -dimethylester, -monoethylester and -diethylester, the comparable esters of the isophthalic acid and of the adipic acid, also acetic acid nonyl- and -decylester as well as trimesinic acid monomethylester, trimesinic acid trimethylester, trimellitic acid trimethylester, pyromellitic acid tetraethylester and so on.

Suitable substances with high melting points are all acids and their anhydrides and all alcohols which at the esterification temperature are not subject to any significant decomposition and are solid or liquefy only after a relatively long period of time when heated in the tunnel oven to the esterification temperature so that they will not form, even when liquid, a homogeneous liquid mass but separate particles uniformly distributed between the grains of the catalyzer. Suitable acids are for example terephthalic acid, isophthalic acid, adipic acid, trimesinic acid, hemimellitic acid, trimellitic acid and pyromellitic acid, and suitable alcohols are n-nonanol-(1), n-decanol-(1) etc. The compound being vaporous esterification conditions can be alcohol such as methyl alcohol, ethyl alcohol, ethylene glycol, phenol, and so on, or an acid, or its anhydride, such as formic acid, acetic acid, acetic acid anhydride, propionic acid, the butyric acids, benzoic acid, salicylic acid etc.

The instantaneous course of the esterification can be suitably assisted by employing the gaseous reacting component -acid or alcohol- in a 1 to 20 fold excess, preferably 4 to 12 fold, and especially 8 to 10 fold, relative to the other component.

As esterification catalyzers any known substances which will accelerate condensation reactions at higher temperatures can be employed provided these substances can be brought into a granular and substantially wear-resistant form. Suitable are for example hydroxides, silicates, phosphates, oxides and borates of the elements of groups I to IV main and secondary series of the periodic system, especially catalyzers consisting of ferric phosphate zinc borate, aluminum phosphate, sodium silicate, silica gel, aluminum oxide, boro-phosphate and lead oxide, and especially metallic compounds of amphoteric nature. Well suitable is also, for example, activated charcoal which has been treated with phosphoric acid. The catalyzer is employed at a grain-size ranging from $40\mu$ to 10 mm., especially 1 to 10 mm., and preferably in quantities which exceed the normally used catalytic quantities. The amount of the catalyzer employed depends on the selected rate of flow, reaction time, esterification temperature and esterification affinity of the mixture and can vary within very wide limits, for example between 10 to 500 percent–and even higher–relative to the solid reaction component present in the oven.

The reaction can be carried out in any tunnel oven which is provided with an external heating device and made of material which offers sufficient resistance in mechanical and chemical respect under reaction conditions, for example a tube made of chromium-nickel steel, enameled iron and the like. If a continuous discharge of the catalyzer also is desired it has been found that it will be advantageous to tilt the pipe somewhat toward the discharging end. In addition to, or in place of this tilt the pipe can be provided with blades or an inner spiral. However, it is also possible to substitute the rotary motion of the tube by use of a feed screw rotating within the stationary, substantially horizontally placed tube.

The esterification is performed at the above mentioned temperatures of 150° to 350° C., preferably 200° to 300° C., and especially 250° to 300° C. The most advantageous temperature for any specific reaction process will depend greatly on the other conditions present. If very high rates of flow are employed it will be advisable to increase the temperature by 10° to 20° C. above the value otherwise used in order to attain full transformation in spite of the reduced staying time. If the increase in temperature effects one of the reaction components unfavorably, the same results can be attained by an increase in the quantity of catalyzer or decrease in its grain-size.

The esterification can be accomplished easily if the solid reaction component is fed in powder form to the input end of the tunnel-oven while the other component which will react in gaseous form, is injected simultaneously either in liquid form through a nozzle or already in gaseous state after appropriate preheating. The catalyzer can be added continuously be means of a separate hopper device, or–as is often advantageous for purposes of quantity control–mixed with the solid reaction component. Another species makes it possible to utilize one single feed device: a suspension is injected consisting of the liquid, vaporous compound as the suspension means and the catalyzer and the compound with the high melting point as the suspended phase.

In all the cases described above there is drawn off at the discharge end of the oven a mixture of the vaporous ester formed, excess reaction components in vaporous state, esterification water and solid catalyzer.

However, it is also possible to place the tunnel oven precisely in horizontal position and replace, if so desired, the devices for the feed of the solids by fins or similar devices which will increase the circulation in the event that operations are to be carried on for longer periods of time by use of the same catalyzer. In this case the two reaction components are simply fed–either separately or in the form of a suspension–into the intake end of the oven which has been loaded with the catalyzer, and solely the gaseous products are then drawn off at the discharge end of the oven. It is expedient in order to prevent any catalyzer from being carried out by the stream of gas to employ relatively low speeds of gas flow, to select relatively coarse catalyzer grain and to draw off the vaporous reaction product from the upper part of the oven end.

The required reaction heat is generally supplied to the oven externally, for example by an electrical heating coil. However, one portion of the required heat can be introduced also by preheating of the second reaction component which will then enter the oven in gaseous form. In certain instances, for example the reaction of a difficultly fusible acid with methylalcohol, it is also possible to furnish the entire esterification heat directly by appropriate preheating of the relatively heat-resisting alcohol and, if desired, by use of heated catalyzer material.

The new process attains extraordinarily rapid esterification because the vaporous component flows through the catalyzer which circulates continuously and is loaded with solid particles of reaction components so that said vaporous component is provided at all times with a new supply of catalyzer grains. In case of the esterification of a dicarboxylic acid with a monoalcohol the formation of the monoalkylester takes place practically immediately and the latter is then transformed continuously into dialkylester, and the output ratio monoester:diester can be set as desired either by varying the length of the furnace or by proper selection of the velocity of flow.

From the discharged vapor there can be separated easily by means of fractional condensation the ester from the excessive second component of the reaction and the latter can be returned to the process, if desired, after removal of the reaction water. The heated catalyzer which emerges from the oven can also be returned to the cycle immediately so that losses of catalyzer will never occur.

The new process is not limited to specific gas velocities and grain-sizes of the solid reaction component and this is greatly advantageous when compared with the known boiling bed method. All values can be varied freely and independently from each other provided they remain within the limitations set by the reaction equilibrium, decomposition temperatures and the like. Consequently, gas velocity, temperature, pressure, grain-size of the catalyzer and grain-size of the solid reaction component can be varied within wide ranges as desired.

This substantial improvement of the process makes it feasible to utilize the same apparatus as well as the catalyzer for a variety of esterifications even if they differ greatly in rapidity of reaction, optimum staying time, temperature, type of basic substances and so on.

In particular, this new process permits the esterification of such terephthalic acids as accrue from the catalytic oxidation of the proper hydrocarbons–their grain-size in may instances being only 15 to $30\mu$–with alcohols such as methanol without the danger of channeling within the boiling bed. Quite to the contrary, the continuing decrease in grain-size of the terephthalic acid which takes place during the esterification will never lead to difficulties; event the smallest particles of the terephthalic acid will never be carried away unprocessed requiring reesterification but are transformed completely in the oven.

Another advantage is the fact that the process can be carried out either at atmospheric or at sub or super atmospheric pressure. Particularly advantageous are also the very brief staying times which will prevent the formation of thermal decomposition products.

It has been proposed previously to esterify polyoxymethylenes with carboxylic acid anhydrides by transforming the polyoxmethylene, moistened with carboxylic acid anhydride, by adding vaporous carboxylic acid anhydride in a drum at temperatures below 170° C. without the presence of catalyzers. However, this process which does not employ catalyzers does not suggest the method of using catalyzer as claimed herein and it fails to suggest the novel and greatly advantageous esterification, for example of the terephthalic acid.

The apparatus aspect of the present invention will now be further explained with reference to the appended drawings, in which FIG. 1 is a diagrammatic representation of one embodiment of an esterification plant showing the use of a tunnel oven in the form of rotary furnace;

FIG. 2 is a cross-sectional view taken on line II—II of FIG. 1 and showing spaced ribs extending longitudinally of the furnace;

FIG. 3 is a diagrammatic representation of an additional embodiment of an esterification plant showing the use of a tunnel oven in the form of a stationary circulation furnace;

FIG. 4 is a simplified plan view of the agitating means of the circulation furnace of the apparatus illustrated in FIG. 3;

and FIG. 5 is a cross-sectional view of the agitating means of FIG. 4.

In FIG. 1, a hopper 1 provides entrance for a TPS-catalyst mixture into a feeding-metering worm device 2, at the discharge end of which latter are located a supply tube 3 for the introduction of nitrogen and superheater means 5 for providing to said device 2 a supply of methanol, forwarded thereto by pump 4 from a suitable source, heated to a predetermined temperature, e.g., 350° C.

At 6 is represented a rotary tubular furnace or tunnel oven provided with internal longitudinal lifters 6' and with electrical heating means 7 and rotated, by drive means 8, in suitable ball bearings 9, 9 at either end of said oven.

A coolant-jacketed cooling-collecting funnel or trap for used solid catalyst is shown at 10. The rotary oven is connected to the stationary feeding-metering device 2 and to the stationary catalyst-collecting funnel or trap 10 through ground seals S,S. A trap 11 for DMT-methanol communicates with the catalyst funnel or trap 10, and with a reflux condenser 12 for condensing methanol and water.

In the alternative apparatus illustrated in FIG. 3, the oven or furnace 15 per se does not revolve, but rather is stationary. It is provided with rotatable agitating means 16 for the thoroughgoing agitation of the particulate solids of the esterification reaction.

In this figure, 20 represents an agitated TPS-methanol storage tank. A pump 21 draws liquid from tank 20 through pipe 22 and forces the same through pipe 23 to a preheater 24. The preheater 24 is jacketed as at 34 for the circulation therethrough of a heated heat-transfer fluid, e.g., heating oil. Preheater 24 is provided with a cleaning means 25 which includes a helical scraper 26. A short conduit 27 leads a heated charge into oven 15 from preheater 24.

The interior of oven 15 contains an elongated agitator 16 which includes an array of longitudinal scrapers 32, 32 secured to a rotatable shaft 30 which protrudes through the end walls of the oven. At one end, shaft 30 is tied in with an electric motor drive means 31 for rotating the agitator assembly and hence agitating a charge of material in said oven. Seals S', S', close the space between shaft 30 and open in the end walls of the oven.

Oven 15 is jacketed, as illustrated at 35, for a current of heating oil therethrough.

From oven 15 there extends a conduit 28 for a current of fluid passing into condenser 29. Exits 41, 42 lead from condenser 29, by way of pipes 42, 43, to a cooling system 44 for carrier hydrocarbon, e.g., orthoxylene. Condenser 29 is disposed above a jacketed trap 48 for liquid DMT, while a recooler 49, provided with rotatable helical cleaning means 25', 26', is connected to trap 48 by conduit means 50. Condenser 49 is disposed above and in communication with a methanol trap 51.

EXAMPLE 1

A tube of chromium-nickel steel with an interior diameter of 50 mm., a length of 1,000 mm., placed at a slight inclination and rotating about its longitudinal axis serves as tunnel oven 6. At one end of the tube there is connected a feeding and metering device 2 and at the other end a discharge device. Ground seals are used on both ends. The oven which is heated, by electrical heating means 7, to 280° C. is charged over a period of two hours with 1,000 parts by weight of a mixture consisting of 332 parts by weight of terephthalic acid having a grain-size of 15 to 30$\mu$ and 666 parts by weight of silica gel having a grain-size of 0.1 to 1 mm.; simultaneously there are introduced per hour 316 parts by weight of methanol heated to 300° C. The used solid catalyzer drops at the rear end of the tube from the oven directly into a collecting funnel 10 while the ester, the excess methanol and the reaction water are drawn off in the form of vapor. The dimethylterephthalate is condensed in a cooling device 12 kept at 144° C. by means of boiling 0-xylene and removed in liquid form. Methanol and water vapors are condensed in a separate cooling device.

The reaction, relative to the terephthalic acid employed, is 100 percent. The ester so formed and separated in the condenser consists of almost pure dimethylterephthalate with a content of 0.8 to 1.5 percent of monomethylterephthalate. No free terephthalic acid is found. Melting point of the ester obtained: 140° C. (theoretical melting point: 141.6° C.).

EXAMPLE 2

In place of the silica gel 1,000 parts by weight of a mixture consisting of 332 parts by weight of terephthalic acid and of 5,000 parts by weight of an aluminum oxide with a grain-size of 500$\mu$ are fed over a period of two hours into the oven which is heated to 280° C. Added thereto are again per hour 316 parts by weight of methanol heated to 300° C. From the drawn-off vapor there are condensed per hour 190 parts by weight of dimethylterephthalate with an acid value of 3.2. The yield is almost equal to the theoretical yield.

EXAMPLE 3

Into the oven heated to 280°–300° C. is introduced over a period of two hours a suspension consisting of 332 parts by weight of terephthalic acid in 632 parts by weight of methanol. The oven, its discharge end now being provided with a fine-meshed chromium-nickel steel screen was previously loaded with 500 parts by weight of coarse-grained silica gel (grain size 0.1 to 8 mm.). The yield of dimethylterephthalate is practically quantitative.

EXAMPLE 4

Into the oven heated to 280°–300° C. is introduced over a period of two hours a suspension consisting of 332 parts by weight of terephthalic acid in 900 parts by weight of ehtanol. The oven, its discharge end being provided with a fine meshed chromium-nickel steel screen was previously loaded with 500 parts by weight of coarse-grained silica gel (grain size 0.1 to 8 mm.) The yield of diethylterephthalate is practically quantitative. Melting point of the ester obtained: 44.0° C.

EXAMPLE 5

Into the oven heated to 280°–300° C. is introduced over a period of two hours a suspension consisting of 332 parts by weight of isophthalic acid in 632 parts by weight of methanol. The oven, its discharge end being provided with a fine meshed chromium-nickel steel screen was previously loaded with 500 parts by weight of coarse-grained silica gel (grain-size 0.1 to 8 mm.). The yield of dimethylisophthalate is practically quantitative. Melting point of the ester obtained: 70.0° C.

We claim:

1. Apparatus for the esterification of a normally solid organic acid in the solid state with normally liquid alcohol in the gaseous or vapor state, in the presence of a granular solid esterification catalyst, which consists essentially of a rotatable tunnel oven;

means for heating said tunnel oven;

means for rotating said tunnel oven;

means for feeding such said acid in solid state and a solid catalyst into one end of said oven;

means for feeding said alcohol in vapor state into said one end of said oven, said alcohol-feeding means including means for forwarding a current of alcohol from a source thereof to said oven, said forwarding means comprising a conduit, a pump and a superheater for vaporizing the alcohol by indirect heating of a current of the alcohol; and means for discharging gaseous products and catalyst from the other end of said oven, said discharging means comprising in combination a catalyst trap connected to the discharge end of the oven, a condenser for alcohol and esterified acid and conduit means connecting said catalyst trap with said condenser.

2. The apparatus defined in claim 1, in which the peripheral inner surface of said tunnel oven is provided with a plurality of spaced lifter members disposed parallel to the major axis of the oven.